(12) United States Patent
Sasaki

(10) Patent No.: US 6,893,999 B2
(45) Date of Patent: May 17, 2005

(54) RECORDING MATERIAL

(75) Inventor: Hidemi Sasaki, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 125 days.

(21) Appl. No.: 10/402,963

(22) Filed: Apr. 1, 2003

(65) Prior Publication Data

US 2003/0186030 A1 Oct. 2, 2003

(30) Foreign Application Priority Data

Apr. 1, 2002 (JP) ........................................ 2002-099090

(51) Int. Cl.⁷ ................................................. B41M 5/40
(52) U.S. Cl. ...................... 503/200; 428/192; 428/194; 503/206; 503/226
(58) Field of Search ................................ 428/192, 194; 503/200, 206, 226

(56) References Cited

FOREIGN PATENT DOCUMENTS

JP 2000-229476 8/2000

*Primary Examiner*—Bruce Hess
(74) *Attorney, Agent, or Firm*—Sughrue Mion, PLLC

(57) ABSTRACT

An UV-ray shielding layer and a moisture barrier layer are formed on edges of a recording paper which includes thermosensitive coloring layers having a fixing property to a ultraviolet ray. Another UV-ray shielding layer and another moisture barrier layer are formed in an opposite side of the support to the thermosensitive coloring layer. The UV-ray shielding layers prevent the ultraviolet ray from penetrating through the edge and the support and from reaching the thermosensitive coloring layers. Further, the moisture barrier layers prevent the thermosensitive coloring layer from absorbing moisture from air. Images are formed in the recording paper adequately without influence of the moisture and the ultraviolet ray during being stocked.

9 Claims, 4 Drawing Sheets

RECORDING MATERIAL

BACKGROUND OF THE INVENTION

1. Field of the Invention

The present invention relates to a recording material, more particularly to a recording material which has a property responsive to ultraviolet rays and in which a coloring sensitivity varies in accordance with humidity.

2. Description Related to the Prior Art

As one of recording materials, a thermosensitive color recording paper for color print is well known. On a support or base of the thermosensitive color recording paper, there are yellow, magenta, and cyan coloring layers which lie on each other. The yellow coloring layer and the magenta coloring layer is provided with a fixing property in ultraviolet ray or light of a predetermined wavelength region. Accordingly, when the thermosensitive color recording paper is illuminated in light including ultraviolet ray, then the thermosensitive coloring layers are fixed such that the coloring sensitivity may vary.

In each of the yellow, magenta, and cyan coloring layers, the coloring sensitivity varies in accordance with hydrous rate. Accordingly, when an image is printed on the thermosensitive color recording paper having high hydrous rate, then the density of each yellow, magenta, and cyan color becomes inadequate and a gray balance is bad. Thus the color print is different from the original. Further, when part of the thermosensitive color recording paper has higher hydrous rate than another part, the print is made uneven.

In order to protect the thermosensitive coloring layers from moisture, scratches and dirt, a protective layer is formed on the uppermost thermosensitive coloring layer on the recording surface. Further, an opposite surface of the thermosensitive color recording paper to the recording surface may be illuminated in the light, which can pass through a support of the thermosensitive recording paper to perform the fixing of the yellow and magenta coloring layers. In order to prevent such the undesirable fixing, Japanese Patent Laid-Open Publication No. 2000-229476 describes the thermosensitive color recording paper in which an optical absorbing layer containing the ultraviolet absorbent, ultraviolet stabilizer or the like is formed on the opposite surface of the thermosensitive color recording paper, or between the support and the thermosensitive coloring layers.

In the thermosensitive color recording paper, there are a sheet type and a continuous type. In the sheet type, the thermosensitive color recording papers are piled up, and the recording surface is not exposed. Accordingly, the influence of the ultraviolet ray and the moisture on the recording surface is small. Further, in the continuous type, as the thermosensitive color recording paper is rolled, the influences of moisture and ultraviolet ray on the recording surface is small. However, the moisture and the ultraviolet ray have influences on part of the thermosensitive coloring layers near to edges of the thermosensitive color recording paper. Accordingly, coloring density changes in edge part of the obtained photo print. Further, the thermosensitive coloring layers often absorbs moistures through the support to change the coloring sensitivity of the yellow and magenta coloring layers.

SUMMARY OF THE INVENTION

An object of the present invention is to provide a recording material in which an image is formed without uneven.

Another object of the present invention is to provide a recording material which prevents the light and moisture from passing though edges thereof.

In order to achieve the object and the other object, a recording material of the present invention includes a support, a recording layers for printing, and an edge protective layer. The recording layer is formed on the support, and has a property responsive to an ultraviolet ray. The edge protective layer is formed on edges of the recording material for protecting the recording layer from at least one of an ultraviolet ray and moisture.

The edge protective layer is constructed of an UV-ray shielding layer and a moisture barrier layer. The UV-ray shielding layer shields the ultraviolet ray incident on the edges of the recording material. The moisture barrier layer prevents the recording material from absorbing the moisture from air through the edges.

Preferably, the recording material further includes an UV-ray shielding layer and a moisture barrier layer between the support and the recording layer, or on a surface of the support oppositely to the recording layer.

In a preferred embodiment of the present invention, two supports are provided through a UV-ray shielding layer. A recording layers and a protective layer are formed on both of the two supports such that the color print can be made on both sides. Further, an edge protective layer is formed on an edge of the recording material.

According to the present invention, as the edge protective layer is formed on the edge of the recording material, it is prevented that the ultraviolet ray and the moisture enter through the edge in the recording material. Thus the color print can be obtained so as to have an adequate density and gray balance. Further, it is preferable that the UV-ray shielding layer is positioned between the two recording layers formed in both sides of a recording material. Thus when the ultraviolet ray is irradiated in order to perform the fixing of the recording layer in the one side of a recording material, the ultraviolet ray is shielded by the UV-ray shielding layer. Therefore, the other recording ray is not fixed thereby.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
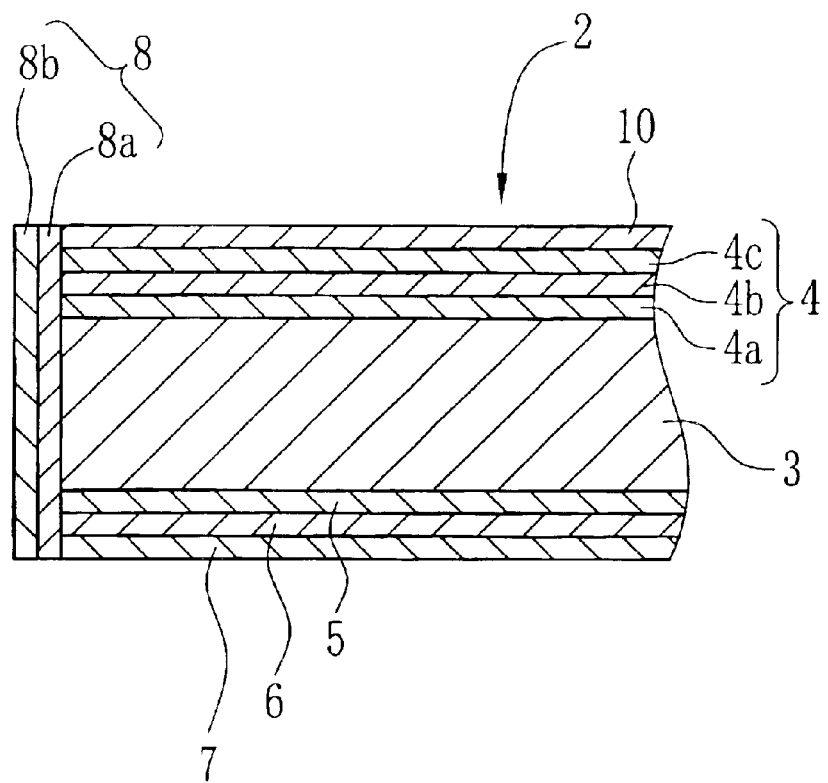
FIG. 1 is a sectional view illustrating a structure of layers in a first embodiment of a thermosensitive color recording paper of the present invention.

In FIG. 1, a thermosensitive color recording paper (hereinafter recording paper) 2 includes a support 3, a thermosensitive layer 4, and a protective layer 10 for protecting the thermosensitive layer 4. The thermosensitive layer 4 and protective layer 10 construct a recording surface 2a of the recording paper 2. At a back surface of the support 3 is formed an UV-ray shielding layer 5, moisture barrier layer 6, and a back layer 7 in this order. An edge of the recording paper 2 is provided with an edge protective layer 8 constructed of an UV-ray shielding layer 8a and a moisture barrier layer 8b. The support 3 and the back layer 7 are formed of materials already known.

In the thermosensitive layer 4, full color images and the like are printed by a thermal printer. The thermosensitive layer 4 includes a cyan coloring layer 4a which lies on the support 3 to construct the lowest layer, a magenta coloring layer 4b which lies on the cyan coloring layer 4a, and an yellow coloring layer 4c which lies on the magenta coloring layer 4b so as to construct the uppermost layer. The yellow coloring layer 4c has the highest thermosensitivity. Accordingly, when a small thermal energy is applied to the recording paper 2, then it colors in yellow. The cyan thermosensitive coloring layer 4a has the lowest thermal sensitivity. Accordingly when the large thermal energy is applied to the recording paper 2, then it colors in cyan. Further, when illuminated in the ultraviolet ray which has a peak at 420 nm, then the yellow coloring layer 4c loses a coloring property. The magenta coloring layer 4b has the thermal sensitivity between the cyan and yellow coloring layers 4a and 4c. Accordingly, the magenta coloring layer 4b colors in magenta, when the thermal energy applied to the recording paper 2 is more than to the yellow coloring layer 4a and less than to the cyan coloring layer 4b. Further, when the illuminated in the ultraviolet ray which has a peak at 365 nm, then the magenta coloring layer 4b loses a coloring property. The protective layer 4c is transparent and protects the thermosensitive layer 4 against the moisture, scratches and the like.

The UV-ray shielding layers 5 and 8a are formed by coating the support 3 with an UV-ray shielding liquid whose main contents are ultraviolet absorbent or ultraviolet stabilizer, and a binder. The moisture barrier layers 6 and 8b are formed by coating the support 3 with a moisture barrier liquid whose main contents are moisture barrier agent and binder.

The recording paper 2 is set in the thermal printer. At first, a yellow image is recorded by a thermal head and thereafter fixed in illumination of the ultraviolet ray. Secondly, the recording and fixing of a magenta image are performed. At last, a cyan image is recorded.

Figure 2:
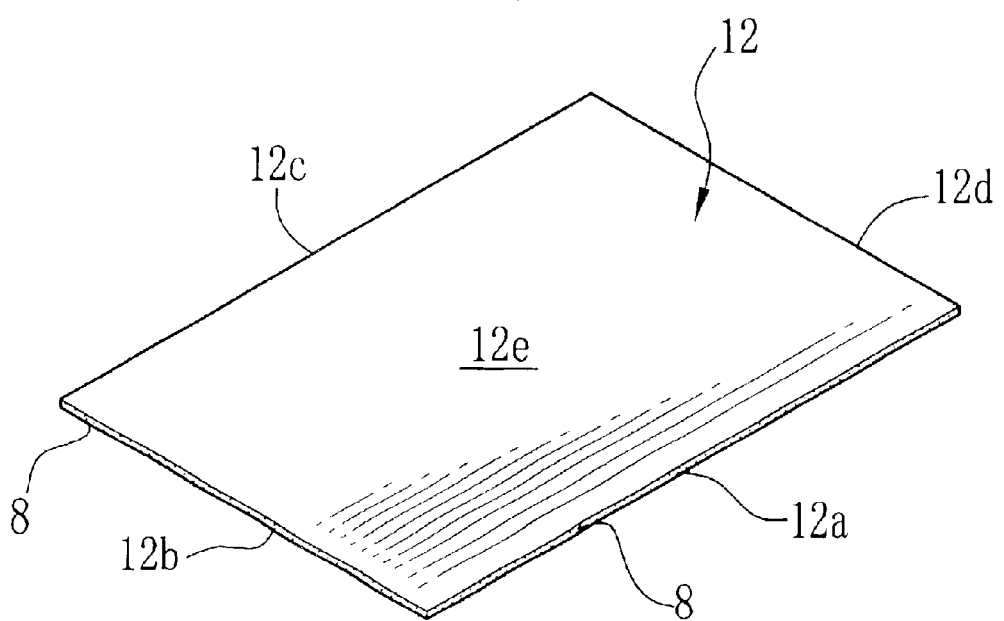
FIG. 2 is a perspective view of a cut type of the thermosensitive color recording paper.

In FIG. 2, a recording paper sheet 12 is made from the recording paper 2. The recording paper sheet 12 has four edges 12a–12d by cut with a cutter and slit by a slitter. As all of the cut edges 12a–12d are exposed, the edge protective layer 8 is formed on the edges 12a–12d.

Although the protective layer 10 is formed in the recording paper sheet, the thickness of the protective layer 10 is small in consideration of the thermo conductivity. Therefore, only the protective layer 10 cannot entirely prevent the moisture from entering in the thermosensitive layers 4. Further, when the recording paper sheets 12 are set to the thermal printer, they are contained in a cassette so as not to be exposed to a room illumination. Thereby, recording surfaces 12e of the recording paper sheets 12 are directed downwards such that the recording surface 12e may not be exposed to the room illumination, and that the moisture may not enter through the protective layer 10 into the themosensitive layer 4. Further, the edge protective layer 8 prevents the light and the moisture from passing through the edges 12a–12d into the thermosensitive layer 4. Note that the recording paper sheet 12 is illustrated so as to have a larger thickness than in real for easy understanding.

Figure 3:
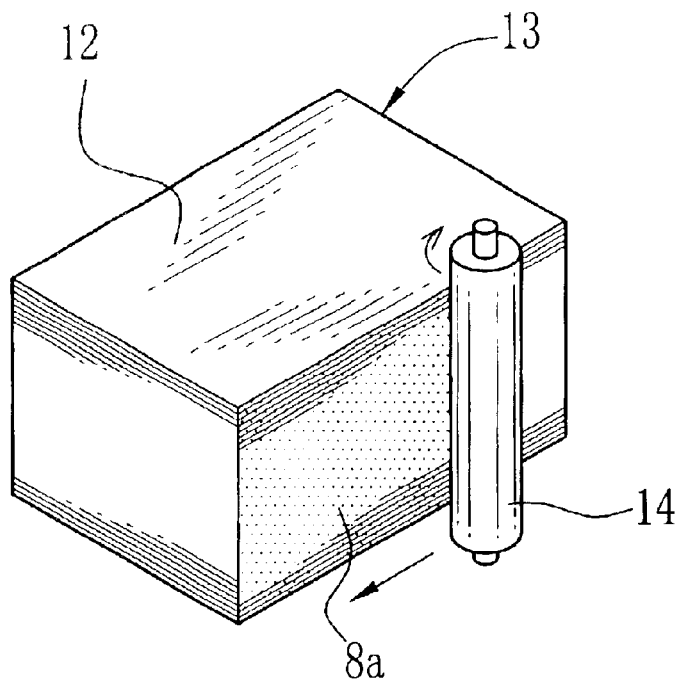
FIG. 3 is an explanatory view illustrating a method of forming an UV-ray shielding layer on an edge of the thermosensitive color recording paper in FIG. 2.

In order to form on the UV-ray shielding layer 8a on the edges 12a–12d, as shown in FIG. 3, the plural recording paper sheets 12 are piled up, and the UV-ray shielding liquid is applied with a roller 14 on a side of the piled recording paper sheets 13 and dried. Thereafter, the moisture barrier liquid is applied with a roller (not shown) to form the moisture barrier layer 8b. Note that the UV-ray shielding liquid and the moisture barrier liquid may be applied with a paint brush or spray gun.

Figure 4:
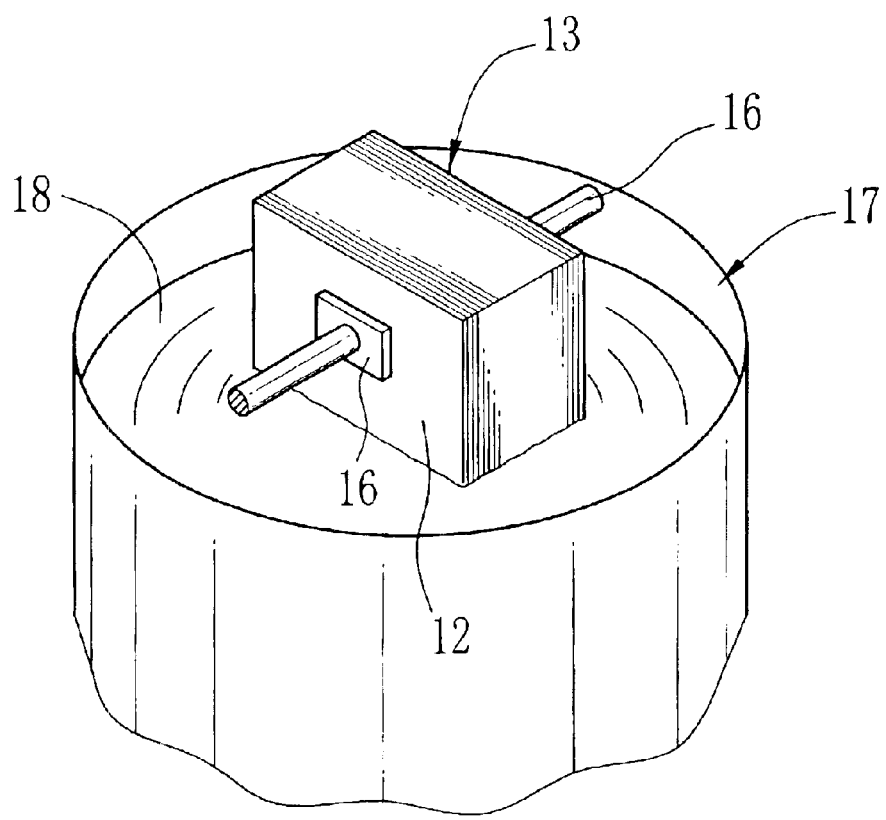
FIG. 4 is an explanatory view illustrating another method of forming the UV-ray shielding layer on the edge of the thermosensitive color recording paper in FIG. 2.

Otherwise, as shown in FIG. 4, the piled recording sheets 13 may be hold by a robot hand 16 and the like, to dip the side of the piled recording sheets 13 in a UV-ray shielding liquid 18 contained in a vessel 17. Thereafter, the UV-ray shielding liquid 18 is dried. It is to be noted that the moisture barrier liquid may be applied in the same method.

Figure 5:
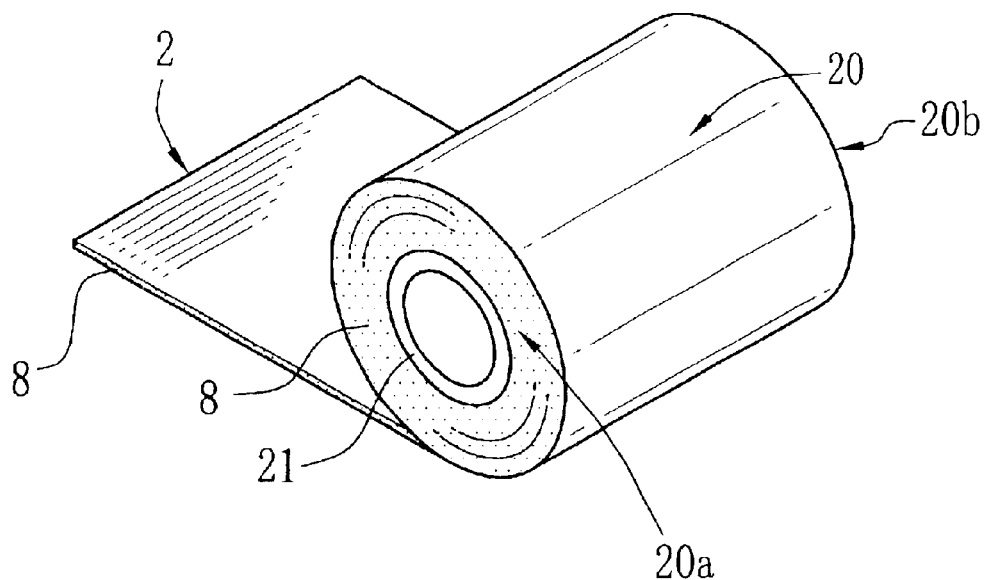
FIG. 5 is a perspective view of a recording paper roll constructed of a continuous type of the thermosensitive color recording paper.

Further, as shown in FIG. 5, a continuous type of the recording paper 2 is rolled around a roll core 21 to construct a recording paper roll 20. In this case, the recording paper 2 is slit from a wide original roll. As both edges of the recording paper are exposed, the edge protective layer is provided on both side surfaces 20a, 20b of the recording paper roll 20.

In the recording paper roll 20, the UV-ray shielding layer and the moisture barrier layer constructing the edge protective layer 8 may be sequentially applied with the roller, a paint brush or spray gun on the side surfaces 20a, 20b in the same method as in the recording paper sheet 12. Further, the recording paper roll 20 may be held with the robot hand and the like, to dip the side surfaces 20a, 20b to the UV-ray shielding liquid and the moisture barrier liquid that are contained in the respective vessels.

Figure 6:
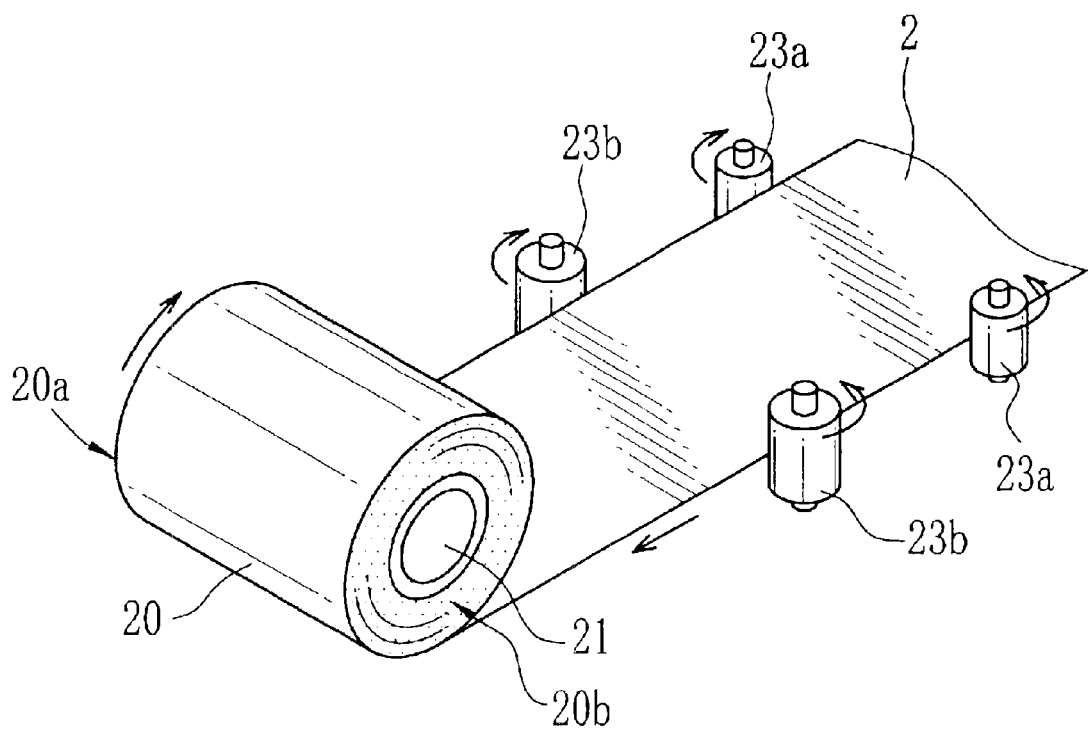
FIG. 6 is an explanatory view illustrating a method of forming the UV-ray shielding layer and a moisture barrier layer on the edges of the thermosensitive color recording paper in FIG. 5.

Otherwise, as shown in FIG. 6, when the continuous recording paper 2 is wound around the roll core 21, the UV-ray shielding liquid and the moisture barrier liquid may be applied on both sides of the continuous recording paper 2 with rollers 23a, 23b respectively.

In the above embodiment, as the UV-ray shielding layer 5 is formed in an opposite side of the support 3 to the thermosensitive layer 4, the ultraviolet ray illuminating the recording surface 2a is entirely shielded not so as to reach the opposite surface of the recording paper 2 to the recording surface 2a. Accordingly, in the present invention, two recording layers are provided, in which images can be formed on both surfaces.

Figure 7:
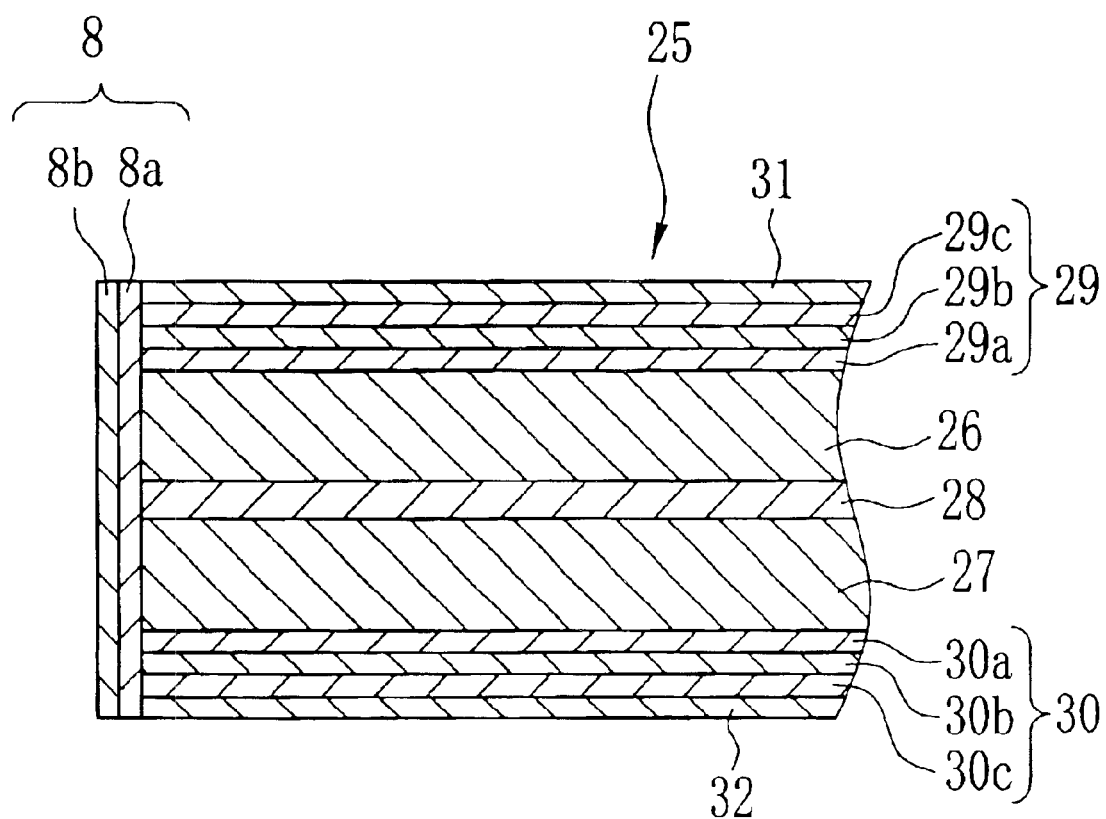
FIG. 7 is a sectional view illustrating a structure of layers in a second embodiment of the thermosensitive color recording paper of the present invention.

In FIG. 7, a recording paper 25 includes two supports 26, 27, an UV-ray shielding layer 28, thermosensitive layers 29, 30 and protective layers 31, 32. The UV-ray shielding layer 28 is sandwiched between the two supports 26 and 27. The thermosensitive layers 29 include cyan, magenta and yellow thermosensitive coloring layers 29a, 29b, 29c. The thermosensitive layers 30 include cyan, magenta and yellow thermosensitive coloring layers 30a, 30b, 30c. Further, each edge of the recording paper 25 is provided with the edge protective layer 8 constructed of the above UV-ray shielding layer 8a and the moisture barrier layer 8b.

In this embodiment, when the fixing of the one surface of the thermosensitive layers 29 is performed, the ultraviolet light is entirely shielded by the UV-ray shielding layer 28.

Accordingly, the recording layers 30 are not fixed on another recording layer 29 of the recording paper 25. The color print can be made on both of the recording surfaces by applying the thermal energy to the surfaces.

In the above embodiment, the edge protective layer 8 is constructed of the UV-ray shielding layer 8a and the moisture barrier layer 8b. However, the present invention is not restricted in it. The edge protective layer has only one of the UV-ray shielding layer and the moisture barrier layer. Further, the edge protective layer may have only single layer having the UV-ray shielding property and the moisture barrier property.

Furthermore, the present invention can be applied not only to the thermosensitive recording paper but also to other recording materials responsive to the ultraviolet ray.

Further, the present invention can be applied to thermosensitive monochrome paper in which one thermosensitive coloring layer is formed.

Various changes and modifications are possible in the present invention and may be understood to be within the present invention.

What is claimed is:

1. A recording material comprising:
    a support;
    a recording layer which is formed on said support and has a property responsive to an ultraviolet ray; and
    an edge protective layer formed on edges of said support and said recording layer, for protecting said recording layer from at least one of said ultraviolet ray and moisture.

2. A recording material as described in claim 1, wherein said edge protective layer includes a UV-ray shielding layer for shielding said ultraviolet ray incident thereon from said edges, and a moisture barrier layer for preventing said recording layer from absorbing said moisture from air through said edges.

3. A recording material as described in claim 2, wherein said UV-ray shielding layer is a first UV-ray shielding layer, further comprising a second UV-ray shielding layer between said support and said recording layer or on said support oppositely to said recording layer.

4. A recording material as described in claim 3, wherein said moisture barrier layer is a first moisture barrier layer, further comprising a second moisture barrier layer between said support and said recording layer or on said support oppositely to said recording layer.

5. A recording material as described in claim 4, wherein said recording layer has a property of becoming fixed by illumination with said ultraviolet ray.

6. A recording material as described in claim 5, wherein said recording layer is constructed of cyan, magenta and yellow coloring layers.

7. A recording material as described in claim 1, wherein said support is a first support and wherein said recording layer is a first recording layer, further comprising:
    a second support,
    a UV-ray shielding layer being sandwiched between said first support and said second support; and
    a second recording layer formed on said second support oppositely to said UV-ray shielding layer, said second recording layer having a property responsive to said ultraviolet ray, and edge of said second support and said second recording layer being protected by said edge protective layer from at least one of said ultraviolet ray and said moisture.

8. A recording material as described in claim 7, wherein said second recording layer has a property of becoming fixed by illumination with said ultraviolet ray.

9. A recording material as described in claim 8, wherein said second recording layer is constructed of cyan, magenta and yellow coloring layers.

* * * * *